(12) United States Patent
Haustein et al.

(10) Patent No.: US 8,494,077 B2
(45) Date of Patent: Jul. 23, 2013

(54) METHOD AND COMMUNICATION SYSTEM FOR TRANSMITTING DATA IN A MULTIPLE-INPUT MULTIPLE-OUTPUT (MIMO) SYSTEM

(75) Inventors: Thomas Haustein, Potsdam (DE); Egon Schulz, München (DE); Wolfgang Zirwas, München (DE)

(73) Assignee: Nokia Siemens Networks Oy, Espoo (FI)

( * ) Notice: Subject to any disclaimer, the term of this patent is extended or adjusted under 35 U.S.C. 154(b) by 300 days.

(21) Appl. No.: 12/988,020

(22) PCT Filed: Apr. 16, 2009

(86) PCT No.: PCT/EP2009/054490
§ 371 (c)(1),
(2), (4) Date: Nov. 8, 2010

(87) PCT Pub. No.: WO2009/127675
PCT Pub. Date: Oct. 22, 2009

(65) Prior Publication Data
US 2011/0064160 A1  Mar. 17, 2011

(30) Foreign Application Priority Data
Apr. 17, 2008  (EP) .................................... 08103594

(51) Int. Cl.
*H04B 7/02* (2006.01)
(52) U.S. Cl.
USPC ........................................................ 375/267

(58) Field of Classification Search
USPC ........................................................ 375/267
See application file for complete search history.

(56) References Cited

U.S. PATENT DOCUMENTS

| | | | |
|---|---|---|---|
| 7,519,129 B2* | 4/2009 | Porter et al. | 375/285 |
| 2005/0101259 A1 | 5/2005 | Tong et al. | 455/69 |
| 2007/0211813 A1 | 9/2007 | Talwar et al. | 375/267 |
| 2008/0018535 A1* | 1/2008 | Hwang et al. | 342/368 |
| 2009/0219838 A1* | 9/2009 | Jia et al. | 370/278 |

FOREIGN PATENT DOCUMENTS

| | | |
|---|---|---|
| EP | 1 838 024 A1 | 9/2007 |
| EP | 1 873 957 A1 | 1/2008 |

OTHER PUBLICATIONS

Cendrillon, R., et al., "Partial Crosstalk Precompensation in Downstream VDAL", © 2004 Elsevier B.V., 15 pgs.

* cited by examiner

*Primary Examiner* — Juan A Torres
(74) *Attorney, Agent, or Firm* — Harrington & Smith

(57) ABSTRACT

Method for transmitting data in a Multiple-Input Multiple-Output (MIMO) system and communication system for transmitting data in a MIMO system. A method for transmitting data in a communication system is provided. The method includes the steps of selecting a first channel (C1) and a second channel (C2), of receiving by the second receiver (Rx2) of first data and frequency resource information, of performing a non-linear pre-coding for second data (D2) of the second channel (x2) and of sending the precoded second data (D2) from the second transmitter (Tx2) to the second receiver (Rx2) and sending the first non-pre-coded data (D1) of the first channel (C1) from a first transmitter (Tx1) to a first receiver (Rx1) at the same timeframe.

17 Claims, 2 Drawing Sheets

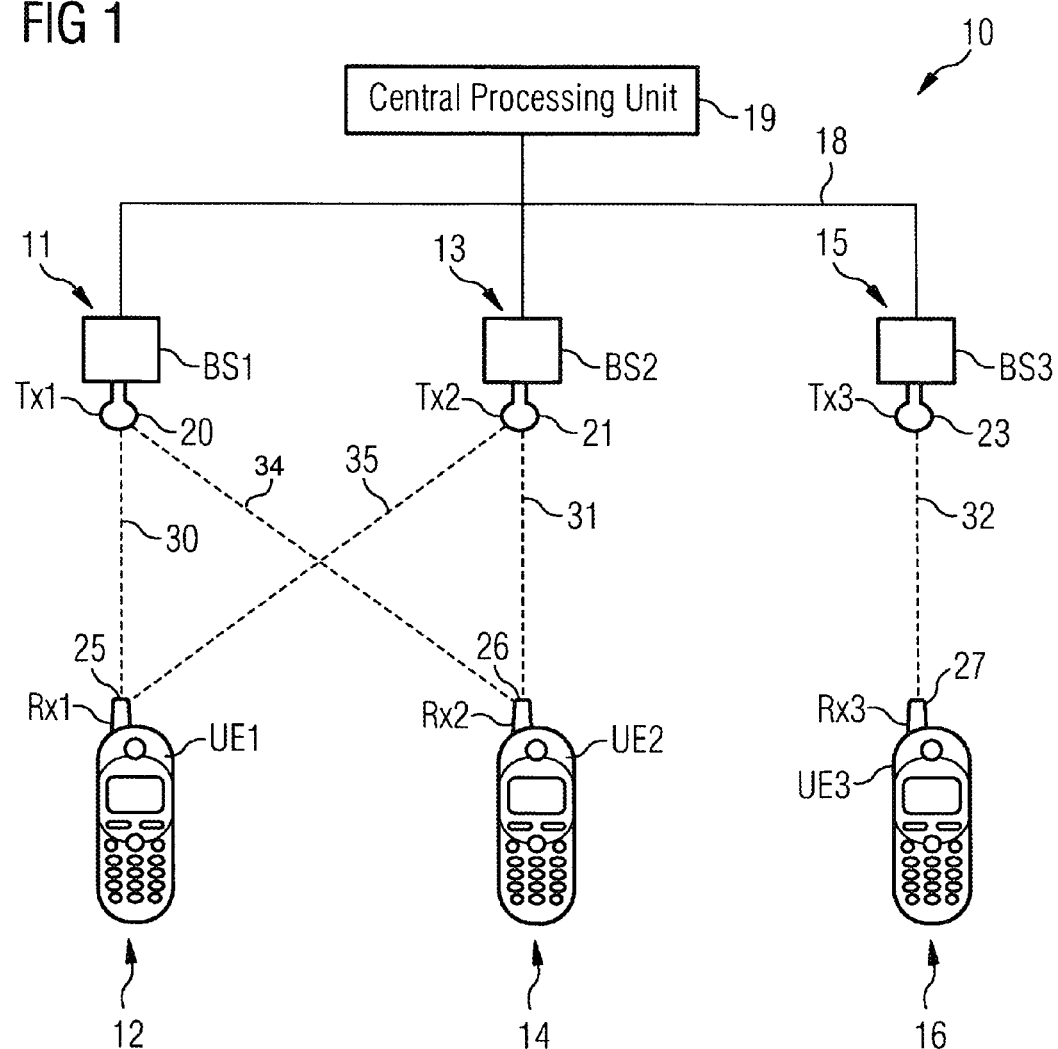

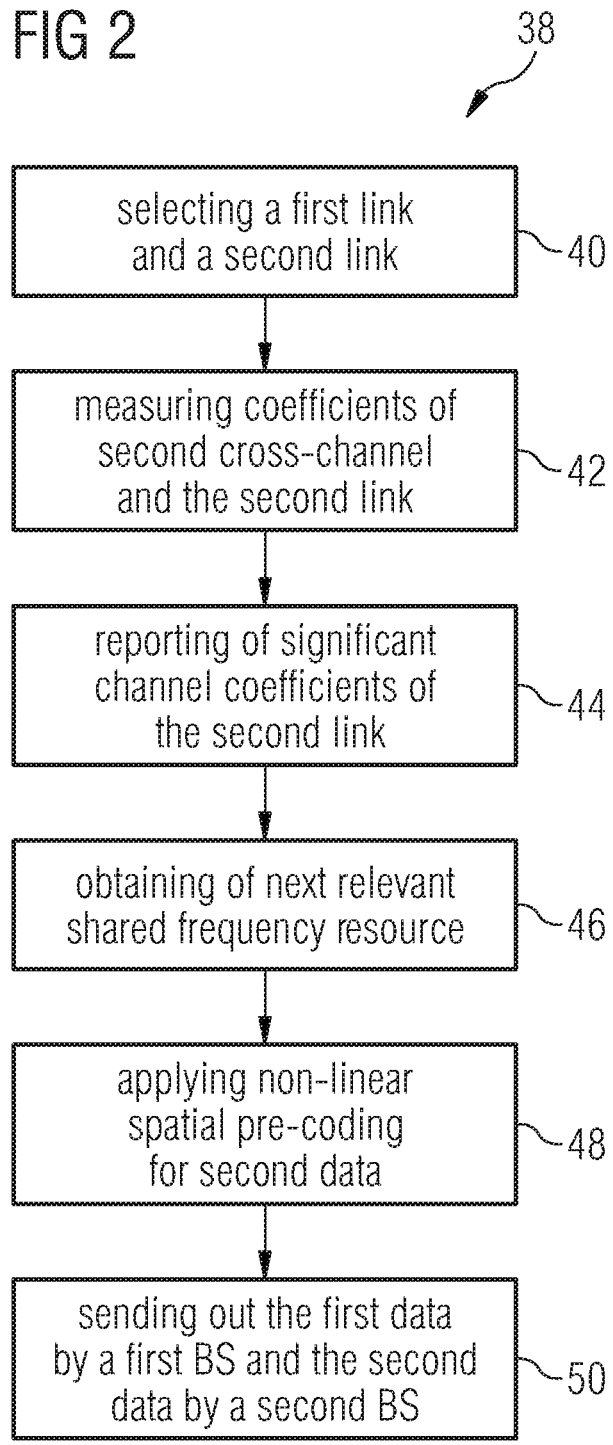

METHOD AND COMMUNICATION SYSTEM FOR TRANSMITTING DATA IN A MULTIPLE-INPUT MULTIPLE-OUTPUT (MIMO) SYSTEM

The invention relates to a method for transmitting data in a MIMO (Multiple-Input Multiple-Output) system and a communication system for transmitting data in a MIMO system.

Intra-base station (BS) or inter-base stations can employ cooperation methods, such as joint pre-processing of transmission signals for several user equipments (UE). The transmission can be for a downlink transfer. These methods can provide higher transmission capacity, according to theoretical analysis.

To reduce complexity and feedback overhead, many approaches restrict cooperation to a few base stations or to a few sectors of one single base station. Cooperation of the sectors is also called intra-base station cooperation. This is a promising approach as no backbone network is included. In combination with other techniques, it has been shown that the restricted cooperation can be of high value and may increase spectral efficiency.

MIMO antenna system can include a cooperative antenna system, such as a joint transmission system. The MIMO antenna system transfers data from a plurality of transmitters to a plurality of receivers. The MIMO antenna system may provide have good performance in the areas of transmission capacity, spectral efficiency, and peak data rates. It is believed that this is the reason that the MIMO antenna system is included in 3GPP (3rd Generation Partnership Project) LTE (Long Term Evolution) specification.

Non-linear pre-coding methods for transmitting signal can provide significant reduction of power enhancement. The pre-coding methods may include multi-layer beam-forming or spatial processing at transmitter side.

BRIEF SUMMARY OF THE INVENTION

A transmission channel can employ frequency selective adaptation methods, such as Orthogonal Frequency-Division Multiplexing (OFDM) or Orthogonal Frequency-Division Multiple Access (OFDMA). These methods can provide robustness transmission of signal.

For the multi-user case, especially in cellular propagation environments, user grouping allows identification of suitable user group that satisfies certain signal and interference conditions. For instance, a user can report to his associated BS which other BS contributes by a significant amount to his receive antenna.

The application provides a method for transmitting data in a communication system.

It is believed that reduction of influence of interference for a transmission link between a transmit antenna and a receive antenna would improve transmission link quantity. The reduction can also improve achievable data throughput. The interference may originate from links of other sector or cell.

A simplified joint user data signal processing can increase spectral efficiency without almost any increase of transmission power of transmit antenna. Feedback of channel state information (CSI) to the transmit antenna, prior to transmission of signal, can be reduced. Temporal variation of overall transmission channel, which may be experienced by a user, can be adapted quickly.

The communication system comprises a first transmitter (Tx1), a second transmitter (Tx2), a first receiver (Rx1), a second receiver (Rx2), first channel (C1), a second channel (C2), a first cross-channel (Cx1), and a second cross-channel (Cx2).

The first transmitter (Tx1) and the second transmitter (Tx2) share a frequency band. The first channel (C1) is provided between the first transmitter (Tx1) and the first receiver (Rx1). The second channel (C2) is provided between the second transmitter (Tx2) and the second receiver (Rx2). The first cross-channel (Cx1) is provided between the second transmitter (Tx2) to the first receiver (Rx1). The second cross-channel (Cx2) is provided between the first transmitter (Tx1) and the second receiver (Rx2)

The method comprises the step of selecting the first channel (C1) and the second channel (C2), of receiving by the second receiver (Rx2) of first data and frequency resource information of the first transmitter (Rx1), of performing a non-linear pre-coding for second data (D2) based on significant second channel coefficients of the second channel (C2), and of sending the pre-coded second data (D2) from the second transmitter (Tx2) to the second receiver (Rx2) and sending the first non-pre-coded data (D1) from the first transmitter (Tx1) to the first receiver (Rx1) at the same timeframe.

The first cross-channel (Cx1) has low power and the second cross-channel (Cx2) has high power. The first data is intended to be sent from the first transmitter (Tx1) to the first receiver (Rx1). The second data (D2) is intended to be sent from the second transmitter (Tx2) to the second receiver (Rx2).

A second base station (BS2) can comprise the second transmitter (Tx2) and a second user equipment (UE2) comprises a second receiver (Rx2).

The method can comprise the further step of sending a message from the second base station (BS2) to the second user equipment (UE2) for informing the second user equipment to measure channel coefficients. The method can also comprise the further step of measuring second cross-channel coefficients of the second cross-channel (Cx2) and the second channel coefficients of the second channel (C2) by the second receiver (Rx2).

The second user equipment (UE2) can identify the second channel coefficients, which are significant. The significant second channel coefficients can comprise large values. The significant second channel coefficients can also correspond to the second cross-channel coefficients, which comprise large values.

The method can comprise the further step of sending the significant second channel coefficients of the second channel (C2) to the second base station (BS2). The method can also comprise the further step of obtaining from the first base station (BS1) by the second base station (BS2) of the shared frequency resource information.

The shared frequency resource information can comprise time slots information that the first transmitter (Tx1) is scheduled to send first data to the first receiver (Rx1) with the same frequency resource as the second transmitter (Tx2).

The method can comprise the further step of obtaining from a first base station (BS1) by the second base station (BS2) of data format information of the first data. The data format information can comprise coding, interleaving, and modulation information.

The transmission between the first transmitter (Tx1) and the first receiver (Rx1) and the transmission between the second transmitter (Tx2) and the second receiver (Rx21) can be over air.

The communication system can further comprise a third transmitter (Tx3), a third receiver (Rx3), a third channel (C3), and a third cross-channel (Cx3).

The third transmitter shares the frequency band with the first transmitter (Tx1) and the second transmitter (Tx2). The third channel (C3) is provided between the third transmitter (Tx3) and the third receiver (Rx3). The third cross-channel (Cx3) is provided between the third transmitter (Tx3) to the second receiver (Rx2).

The method can comprise the further step of sending a third non-pre-coded data (D3) from the third transmitter (Tx3) to the third receiver (Rx3) at the same timeframe. The method can also comprise the further step of measuring third cross-channel coefficients of the third cross-channel (Cx3) by the second receiver (Rx2). The significant second channel coefficients can also corresponds with the third cross-channel coefficients, which comprises large values. The method can comprise the further step of obtaining from the third base station (BS3) by the second base station (BS2) of third shared frequency resource information and data format information of the third data.

A communication system, the communication system comprises a first transmitter (Tx1), a second transmitter (Tx2), a first receiver (Rx1), a second receiver (Rx2), a first channel (C1), a second channel (C2), a first cross-channel (Cx1), a second cross-channel (Cx2), a selection means, and a pre-coding means, and a transmitting means.

The first transmitter (Tx1) and the second transmitter (Tx2) have a shared frequency band. The first channel (C1) is provided between the first transmitter (Tx1) and the first receiver (Rx1). The second channel (C2) is provided between the second transmitter (Tx2) and the second receiver (Rx2). The first cross-channel (Cx1) is provided between the second transmitter (Tx2) to the first receiver (Rx1). The second cross-channel (Cx2) is provided between the first transmitter (Tx1) and the second receiver (Rx2). The first cross-channel (Cx1) has low power and the second cross-channel (Cx2) has high power

TECHNICAL FIELD

The selection means is for selecting a first channel (C1) and a second channel (C2). The pre-coding means is for non-linear pre-coding second data (D2) being intended to be transmitted from the second transmitter (Tx2) to the second receiver (Rx2). The transmitting means is for sending the pre-coded second data (D2) from the second transmitter (Tx2) to the second receiver (Rx2) and for sending a first non-pre-coded data (D1) from the first transmitter (Tx1) to the first receiver (Rx1) at the same timeframe.

The communication system can further comprise a second base station (BS2), which comprises the second transmitter (Tx2). The communication system can further comprise a second base station (BS2), which comprises the second transmitter (Tx2) and the first transmitter (Tx1).

The communication system can further comprise a second user equipment (UE2) comprises the second receiver (Rx2). The communication system can further comprise a second user equipment (UE2) comprises the second receiver (Rx2) and the first receiver (Rx1).

The second base station (BS2) can comprise the pre-coding means and the transmitting means. A central processing unit can comprise the selecting means pre-coding means and the transmitting means, the second base (BS2) is connected to the central processing unit.

The application provides an antenna system that has almost the same performance of a full-cooperation antenna system and without requirements of the full-cooperation antenna system.

The application does not require a fast backbone for transmit antennas nor a fast central processing unit. In contrast, the full cooperation antenna system would require the fast backbone and the fast central processing unit.

Number of channel estimations required for the application is less than the number of channel estimations required for the full-cooperation antenna system. The channel estimation generates pilot symbol overhead. Accuracy of the channel estimation required for the application is also less than the corresponding accuracy required for the full cooperation antenna system. Feedback signals to support frequency division duplex (FDD) schemes for the application is also less than the corresponding feedback signals required for the full cooperation system.

BRIEF DESCRIPTION OF THE DRAWINGS

The application is demonstrated with help of the following figures.

FIG. 1 illustrates a signal transmission from a sender to a receiver in a telecommunication system, and FIG. 2 illustrates a flow chart for a method of using the telecommunication system of FIG. 1.

DETAILED DESCRIPTION OF THE INVENTION

FIG. 1 depicts a telecommunication system 10.

The telecommunication system 10 has a first link pair of a first base station (BS1) 11 and a first user equipment (UE1) 12, a second link pair of a second base station (BS2) 13 and a second user equipment (UE2) 14, and a third link pair of a third base station (BS3) 15 and a third user equipment (UE3) 16.

The BS1 11, the BS2 13, and the BS3 15 are connected to a backbone 18 that is connected to a central processing unit 19.

The BS1 11, the BS2 13, and the BS3 15 have a first transmit antenna Tx1 20, a second transmit antenna Tx2 21, and a third transmit antenna Tx3 23, respectively. Similarly, the UE1 12, the UE2 14, and the UE3 16 have a first receive antenna Rx1 25, a second receive antenna Rx2 26, and a third receive antenna Rx3 27, respectively.

The Tx1 20 is connected to the Rx 1 25 by a first air communication path 30 whilst the Tx2 21 is connected to the Rx2 26 by a second air communication path 31. The Tx3 23 is connected to the Rx3 27 by a third air communication path 32. The Tx1 20 is also connected to the Rx2 26 by a first interference path 34. Similarly, the Tx2 21 is connected to the Rx1 25 by a second interference path 35.

The first air communication path 30, the second air communication path 31, or the third communication 32 is also called a channel whilst the first interference path 34 or the second interference path 35 is also called a cross-channel.

In a broad sense, the BS1 11, the BS2 13, or the BS3 15 can comprise at least one transmit antenna or at least one receive antenna. Similarly, the UE 1 12, the UE2 14, or the UE3 16 can include at least one transmit antenna or at least one receive antenna.

The Tx1 20, the Tx2 21, or the Tx3 23 can be connected to the same base station instead of separate base stations. The BS1, the BS2, and the BS3 may be part of one physical base station with the BS1, BS2, or the BS3 being called sectors of the one base station. As an option, each of the BS1, the BS2 and the BS3 represent a single base station, the base station being located separately. The Rx1 25, Rx2 26, or the Rx3 27 can be connected to the same user equipment instead of separate user equipment. The central processing unit 19 may comprise of multiple processing units that reside individually in the BS1 11, the BS2 13, and the BS3 15.

Each of the Rx1 25, the Rx2 26, or the Rx3 27 is a form of a receiver. Each of the Tx1 20, the Tx2 21, or the Tx3 23 is a form of a transmitter. The transmitter can send signals to the receiver over air or other medium.

The BS1 11, the BS2 13, and the BS3 15 are used to transmit the signals to the UE1 12, the UE2 14, and the UE3 16, respectively in the same frequency band. The signals carry the broadcasted data. The BS1 11, the BS2 13, or the BS3 15 can receive channel coefficients from the Tx1 20, the Tx2 21, or the Tx3 23, respectively and perform pre-coding for data for transmission based on the channel coefficients. The BS1 11, the BS2 13, or the BS3 15 can use the central processing unit to perform the non-linear pre-coding or the non-linear pre-coding is preformed locally in one of the BS1, the BS2, or the BS3. Each one of the base stations, the BS1 11, the BS2 13, and the BS3 15 is communication with the other base station, the BS1 11, the BS2 13, or the BS3 15. The BS1 11, the BS2 13, or the BS3 15 may obtain data format information of other base stations, the BS1 11, the BS2 13, or the BS3 15.

The transmission of signals may generate interference with signals on other channels. The interference of other channels occurs when transmitting signals over the same frequency band and the same timeframe as the other channels.

The signals from the BS1 11 to the UE1 12 interfere with the signals that are received by the UE2 14 from the BS2 13 by the second interference path 35. Likewise, the signals from the BS2 13 to the UE2 14 interfere with the signals that received by the UE1 12 from the BS1 11 by the first interference path 34. The interference is also called cross talk.

The UE1 12 measures channel coefficients for signals transmitted over the air communication path 30. The UE1 12 selects the significant channel coefficients for sending to the BS1 11. Similarly, the UE2 14 measures channel coefficients for the signals transmitted over the air communication path 31. The UE2 14 selects the significant channel coefficients for sending to the BS2 26. The channel coefficients include channel phase and gain.

BACKGROUND OF THE INVENTION

The backbone 18 is intended for transmission of information among the BS1 11, the BS2 13, the BS3 15 and the central processing unit 19.

The central processing unit 19 can be used to support the BS1 11, the BS2 13, and the BS3 15 perform pre-coding of data.

FIG. 2 shows a flow chart 38 for a method of using the telecommunication system 10.

The method comprises selecting the first air communication path 30 and the second air communication path 31, as illustrated a step 40 of in FIG. 2.

The selection is done such that the first interference path 34 has a low power across operative frequency range. The low power here implies that channel coefficients of the first interference path 34 have low values or a power that is low with reference to average signal power. The other interference path 35 has high power. The high power implies a power that is higher that the low power.

The high power here refers a power that is higher than the low power.

The Tx2 21 then signals the Rx2 26 to measure channel coefficients of the second interference path 35. The channel coefficients of the second interference path 35 and the second air communication path 31 are afterward measured, as shown in a step 42 of FIG. 2.

The channel coefficients include channel path gains and phase. Methods to estimate channel coefficients include channel interpolation, adaptation to time variance, and frequency selectivity of transmission channels or advanced scheme, such as subspace adaptation.

The significant channel coefficients of the second interference path 35 are later identified and they are then reported to the BS2 13, as depicted in a step 44 of FIG. 2. Selection criteria of the significant channel coefficients are large values and that they correspond to channel coefficients of the second interference path 35 that also has large values. Since only significant channel coefficients are reported, the reporting is selective thereby producing a reduced number of feedback.

The BS2 13 then obtains of next shared relevant frequency resource information from the BS1 11. This is shown in a step 46 of FIG. 2. The next shared relevant frequency resource information includes information about the time slots in which the Tx1 20 is scheduled to send first data to the Rx1 25 with the same frequency resource as the Tx2 21. The second BS2 13 also obtains from the BS1 11 data format information of the first data that is intended to be send form the BS1 11 to the UE1 12. The data format information includes coding, interleaving, and modulation mapping. The shared relevant frequency resource information or the data format information may be called user data.

The BS2 13 later performs non-linear spatial pre-coding on the second data that is present on the shared frequency resource before transmission of the second data, as depicted in a step 48 of FIG. 2. The BS2 13 applies Costa's scheme of pre-coding on the second data to reduce cross talk.

The non-linear pre-coding methods is be implemented using Costa's scheme, "Writing on dirty paper", or a variant of the Costa's scheme. The Costa's scheme can effectively reduce signal degradation due to interference from cross talk. This scheme is shown in M. Costa, "Writing on dirty paper", IEEE Transactions on Information Theory, vol. 29, pp. 439-441, May 1983.

The Costa's scheme provides an adjustment of a signal, before the signal is transmitted, to account for interference that the signal will encounter during transmission. In this scheme, pilot symbols of interference source and of interference channel are known prior to transmission of the signal.

Overall channel can be decomposed by a QRD (QR Decomposition) or a QLD (QL Decomposition) technique into a triangular structure of a corresponding equivalent channel.

The Tx1 20 then sends the first data to the Rx1 25 and the Tx2 21 then the second data to the Rx2 26, as shown in a step 50 of FIG. 2.

Advantages of the method are described below.

The method can be combined with user grouping methods in order to benefit from right selection of user pairs that are suitable for the application.

The method works well with top-M feedback approach that is discussed in 3GPP LTE (Long Term Evolution).

Channel coherence time of signal and interference power usually strongly depends on signal strength and interference strength. Deep signal fade and interference fade generally have a much shorter duration than the above average signals. Therefore, the channel coherence time for selected strong channels is significantly longer than for those where a good signal to interference ratio is due to a fade on interfering channel coefficient.

Channel estimation of a strong interfering signal is more accurate than channel estimation of a fade.

The UE2 14 reports on resources that meet described selection criteria. This reduces channel coefficient feedback signalling to only one channel coefficient per frequency resource or resource block and to only the more significant resource. This results in a substantial feedback reduction.

Information exchange for coordinated non-linear pre-coding reduces to selective feedback of a few channel coefficients and to an exchange of user data between the BS1 11 and the BS2 13 prior to transmission of signal.

Non-linear pre-coding, such as Costa's "Writing on Dirty paper" scheme, can reduce or eliminate influence of interference, if the interference channel and interfering data symbols are known prior to transmission of signal.

Calculations of pre-coding algorithms required of the method are less than the corresponding calculations required for a full-cooperation system. Most pre-coding algorithms, such as Zero forcing (ZF), generate mutual interference nulls between receiving mobile stations. Due to large spatial separation of transmission antennas, these interference nulls can be unstable, which require a high update rate of channel state information (CSI) information.

When performing non-linear pre-coding, instead of non-linear decoding, only binary data including coding, interleaving, and modulation mapping need to be known. Whilst non-linear detection in general requires an exchange of quasi-analogue samples at symbol level that requires higher data rates between the two BS and more stringent timing requirements.

Temporal variation of the transmitting signal and interference from neighbouring transmit antenna only depend on mobility of the UE2 14 and not on the mobility of the UE1 12. When this method is applied on the uplink, the interference channel is determined by the mobility of the UE1 12 as well and is not independent of the UE1 12 anymore.

In a broad sense, the method can be applied for an uplink transfer of signal as well as downlink transfer of the signal.

The BS1 11, the BS2 13, or the BS2 15 can transmit or receive signals from the UE1 12, the UE2 14, or the UE3 16, respectively.

The method may include a step of compensating interference from more than one source, such as the BS3 15. The step includes selecting a suitable user grouping, the user group comprises a plurality of links. Interference of all interference channels are ranked for the link. The interference is based on channel coefficients of the interference channel. Accordingly, more data from the receive antenna have to be requested from interfering base stations and from the interference channels.

The method can also be applied to multi-carrier systems, such as OFDM (Orthogonal Frequency-Division Multiplexing), DFT (Discrete Fourier Transform)-pre-coded OFDM, MC-CDMA (Multi-Carrier Code Division Multiple Access) and also standard CDMA (Code division multiple access), as long as triangular structure of composed multi-user multi-BS channel can be obtained by suitable user grouping.

The method can apply other forms of non-linear spatial pre-coding, such as Tomlinson-Harashima pre-coding and vector perturbation techniques.

The Tomlinson-Harashima pre-coding is shown in M. Tomlinson, "New Automatic Equalizer Employing Modulo Arithmetic", Electronic Letters, pp. 138-139, March 1971, and H. Harashima, Miyakawa, "Matched-Transmission Technique for Channels with Intersymbol Interference", IEEE Journal on Communications, pp. 774-780, August 1972.

The vector perturbation technique is shown in

B. Hochwald, B. Peel, and A. L. Swindlehurst, "A Vector perturbation technique for near capacity multiantenna multiuser communication-Part II: Perturbation," IEEE Trans. Comm., vol. 53, no. 3, pp. 537-545, March 2005.

In short, the above method starts with selecting a first link that is placed between a first transmit antenna and a first receive antenna and a second link is placed between a second transmit antenna and a second receive antenna. The first transmit antenna is for sending a first data to the first receive antenna whilst the second antenna is for sending a second data to the second receive antenna.

The first link has a first cross-channel that has low power over operative frequency range. The first cross-channel is being placed between the second transmit antenna and the first receive antenna. The second cross-channel is placed between the first transmit antenna and the second receive antenna.

After this, second channel coefficients of a second cross-channel and the second link are measured at the second receive antenna. Significant second channel coefficients are then reported to second base station of the second transmit antenna. The significant channel coefficients of the second link have large values and they correspond to channel coefficients of the second cross channel that also has large values.

The second base station then obtains next relevant shared frequency resource information from a first base station of the first transmit antenna. The next shared frequency resource information includes time slots that the first transmit antenna is scheduled to send user data to the first receive antenna at the same frequency resource as the second transmit antenna. The second transmit antenna is also aware of corresponding data of the user data, such as coding, interleaving, and modulation mapping.

The second base station afterwards applies non-linear spatial pre-coding for the second data before transmission of the second data to reduce cross talk. After this, first base station sends the first data and the second base station sends the pre-coded second data on the shared frequency resource.

List of Abbreviations
    BBS Broadcasting Base Station
    BCG Broadcast Cellular Guard
    BS1 first base station
    BS2 second base station
    BS3 third base station
    BWA Broadband Wireless Access
    CSI channel state information
    FDD frequency division duplexing
    MIMO multiple input multiple output
    Rx1 first receive antenna
    Rx2 second receive antenna
    Rx3 third receive antenna
    Tx1 first transmit antenna
    Tx2 second transmit antenna
    Tx3 third transmit antenna
    UE1 first user equipment
    UE2 second user equipment
    UE3 third base station Reference Number List
10 telecommunication system
11 first base station (BS1)
12 first user equipment (UE1)
13 second base station (BS2)
14 second user equipment (UE2)
15 third base station (BS3)
16 third user equipment (UE3)
18 backbone
19 central processing unit
20 first transmit antenna Tx1
21 second transmit antenna Tx2
23 third transmit antenna Tx3
25 first receive antenna Rx1

26 second receive antenna Rx2
27 third receive antenna Rx3
30 first air communication path
31 second air communication path
32 third air communication path
34 first interference path
35 second interference path
38 flow chart
40 step
42 step
44 step
46 step
48 step
50 step

The invention claimed is:

1. A method for transmitting data in a communication system, the communication system comprising:
   a first base station (BS1) comprising a first transmitter (Tx1),
   a second base station (BS2) comprising a second transmitter (Tx2),
   the first transmitter (Tx1) and the second transmitter (Tx2) sharing a frequency band,
   a first user equipment (UE1) comprising a first receiver (Rx1),
   a second user equipment (UE2) comprising a second receiver (Rx2),
   a first channel (C1) being provided between the first transmitter (Tx1) and the first receiver (Rx1),
   a second channel (C2) being provided between the second transmitter (Tx2) and the second receiver (Rx2),
   a first cross-channel (Cx1) being provided between the second transmitter (Tx2) to the first receiver (Rx1), and
   a second cross-channel (Cx2) being provided between the first transmitter (Tx1) and the second receiver (Rx2),
   the method comprising the steps of;
      a) selecting the first channel (C1) and the second channel (C2) wherein the first cross-channel (Cx1) has low power and the second cross-channel (Cx2) has high power,
      b) receiving by the second receiver (Rx2) first data being intended to be sent from the first transmitter (Tx1) to the first receiver (Rx1) and frequency resource information of the first transmitter (Rx1),
      c) performing a non-linear pre-coding for second data (D2) being intended to be sent from the second transmitter (Tx2) to the second receiver (Rx2) based on second channel coefficients of the second channel (C2), and
      d) sending the pre-coded second data (D2) from the second transmitter (Tx2) to the second receiver (Rx2), sending a first non-pre-coded data (D1) from the first transmitter (Tx1) to the first receiver (Rx1) at the same timeframe, and sending a message from the second base station (BS2) to the second user equipment (UE2) for informing the second user equipment (UE2) to measure channel coefficients and to report the channel coefficients,
   wherein the second receiver (Rx2) measures second cross-channel coefficients of the second cross-channel (Cx2) and the second channel coefficients of the second channel (C2) and identifies significant second channel coefficients, the significant second channel coefficients comprising coefficients having large values.

2. The method according to claim 1, characterised in that the significant second channel coefficients corresponds with the second cross-channel coefficients, which comprise large values.

3. The method according to claim 1, characterised in that the method comprises the further step of sending the significant second channel coefficients of the second channel (C2) to the second base station (BS2).

4. The method according to claim 1, characterised in that the method comprises the further step of obtaining from the first base station (BS1) by the second base station (BS2) the shared frequency resource information.

5. The method according to claim 1, characterised in that the transmission between the first transmitter (Tx1) and the first receiver (Rx1) and the transmission between the second transmitter (Tx2) and the second receiver (Rx2) are over air.

6. The method according to claim 1, characterised in that the communication system further comprising:
   a third transmitter (Tx3), the third transmitter (Tx3) shares the frequency band with the first transmitter (Tx1) and the second transmitter (Tx2)
   a third receiver (Rx3),
   a third channel (C3) being provided between the third transmitter (Tx3) and the third receiver (Rx3), and
   a third cross-channel (Cx3) being provided between the third transmitter (Tx3) to the second receiver (Rx2) (26), the method comprises
      in step c) the further step of sending a third non-pre-coded data (D3) from the third transmitter (Tx3) to the third receiver (Rx3) at the same timeframe.

7. The method according to claim 4, characterised in that the shared frequency resource information comprises time slots information that the first transmitter (Tx1) is scheduled to send first data to the first receiver (Rx1) with the same frequency resource as the second transmitter (Tx2).

8. The method according to claim 6, characterised in that the method comprises the further step of measuring third cross-channel coefficients of the third cross-channel (Cx3) by the second receiver (Rx2).

9. The method according to claim 6, characterised in that the method comprises the further step of obtaining from the third base station (BS3) by the second base station (BS2) of third shared frequency resource information and data format information of the third data.

10. The method according to claim 7, characterised in that the method comprises the further step of obtaining from a first base station (BS1) by the second base station (BS2) of data format information of the first data.

11. The method according to claim 8, characterised in that the significant second channel coefficients also corresponds with the third cross-channel coefficients, which comprises large values.

12. The method according to claim 10, characterised in that the data format information comprises coding, interleaving, and modulation information.

13. A communication system, the communication system comprises:
   a first base station (BS1) comprising a first transmitter (Tx1),
   a second base station (BS2) comprising a second transmitter (Tx2), the first transmitter (Tx1) and the second transmitter (Tx2) comprises a shared frequency band,
   a first user equipment (UE1) comprising a first receiver (Rx1), a second user equipment (UE2) comprising a second receiver (Rx2),
   a first channel (C1) being provided between the first transmitter (Tx1) and the first receiver (Rx1), a second channel (C2) being provided between the second transmitter (Tx2) and the second receiver (Rx2), a first cross-channel (Cx1) being provided between the second transmitter (Tx2) to the first receiver (Rx1), a second cross-channel (Cx2) being provided between the first transmitter (Tx1) and the second receiver (Rx2), a selection means for selecting a first channel (C1) and a second channel (C2), the first cross-channel (Cx1) has low power and the second cross-channel (Cx2) has high power, a pre-coding means for non-linear pre-coding second data (D2) being intended to be sent from the second transmitter (Tx2) to the second receiver (Rx2), and a transmitting means for sending the pre-coded second data (D2) from the second transmitter (Tx2) to the second receiver (Rx2) and for sending a first non-pre-coded data (D1) from the first transmitter (Tx1) to the first receiver (Rx1) at the same timeframe, wherein the second base station (BS2) further comprises transmitting means arranged to transmit a message to the second user equipment (UE2) for informing the second user equipment (UE2) to measure channel coefficients and report the channel coefficients, wherein the second receiver (Rx2) has means arranged to measure second cross-channel coefficients of the second cross-channel (Cx2) and second channel coefficients of the second channel (C2) and to identify significant second channel coefficients, the significant second channel coefficients comprising coefficients having large values.

14. The communication system of claim 13, characterised in that the communication system further comprises a second base station (BS2), which comprises the second transmitter (Tx2) and the first transmitter (Tx1).

15. The communication system of claim 13, characterised in that the communication system further comprises a second user equipment (UE2) comprises the second receiver (Rx2) and the first receiver (Rx1).

16. The communication system of claim 13, characterised in that the second base station (BS2) comprises the pre-coding means and the transmitting means.

17. The communication system of claim 13, characterised in that a central processing unit comprises the selecting means pre-coding means and the transmitting means, the second base station (BS2) is connected to the central processing unit.

* * * * *